UNITED STATES PATENT OFFICE.

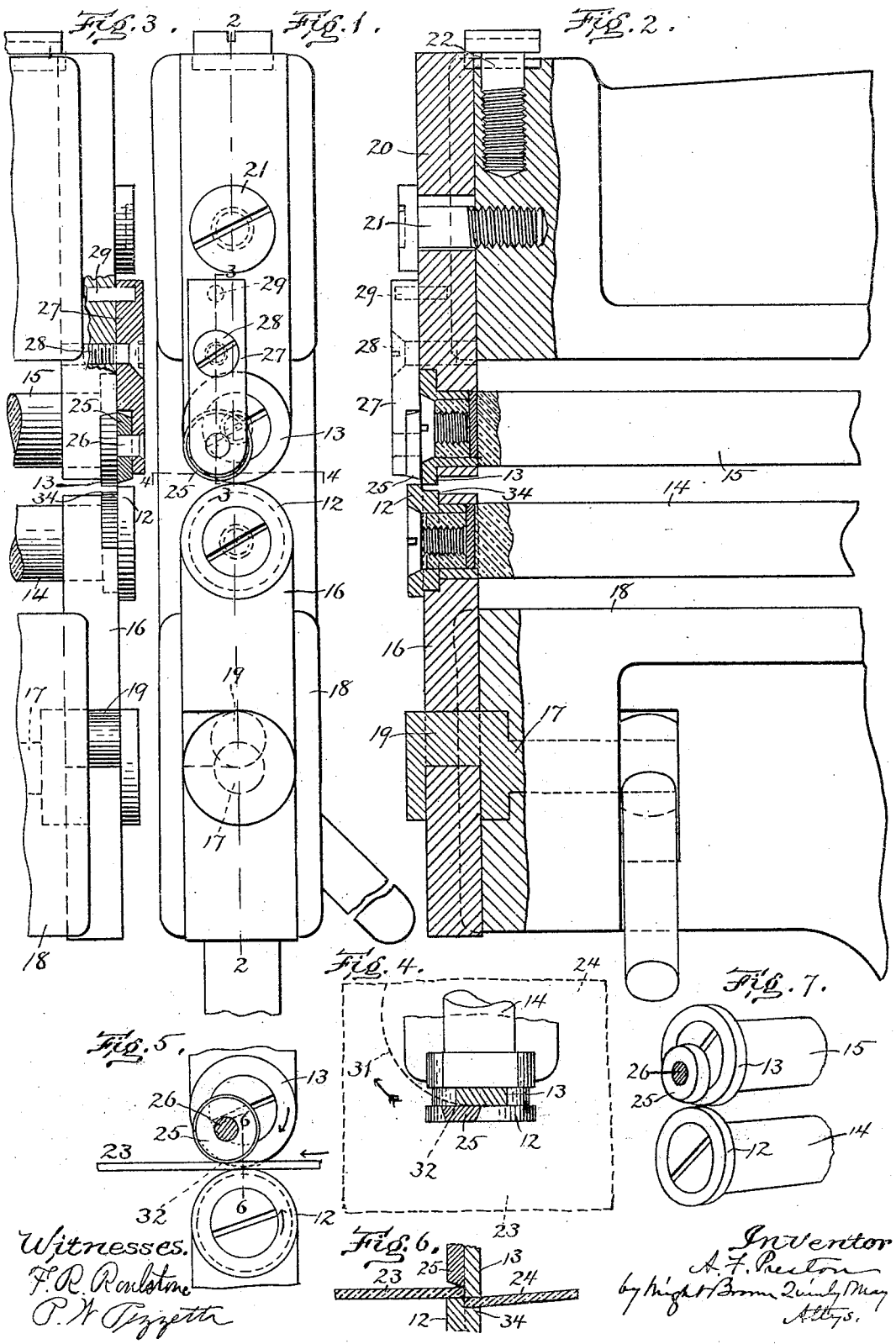

ALBERT F. PRESTON, OF BOSTON, MASSACHUSETTS.

MACHINE FOR CUTTING SHEET MATERIAL.

938,788.     Specification of Letters Patent.     Patented Nov. 2, 1909.

Application filed December 18, 1908. Serial No. 468,193.

*To all whom it may concern:*

Be it known that I, ALBERT F. PRESTON, of Boston, in the county of Suffolk and State of Massachusetts, have invented certain new and useful Improvements in Machines for Cutting Sheet Material, of which the following is a specification.

This invention relates to machines for cutting sheet material, such as thick paper-board used for making patterns, by which parts of boot and shoe uppers are cut, the machine including a pair of rotary disk cutters mounted in shearing relation to each other, so that a sheet of material placed between said cutters will be cut by the shearing coöperation of one cutter with the other.

In cutting thick sheets by rotary disk shears, the displacing action of the shears on the material is such as to form a prominent and objectionable bur on the edges of the material which have an inward or reëntrant curvature, this bur being due to the lateral pressure of the material at one side of the line of cut against one of the two overlapping disk cutters.

My invention has for its object to prevent this objectionable distortion of the material along reëntrant curves by the cutters employed, and to this end consists of a pair of rotary disk cutters mounted in shearing relation to each other, and a pressing member located beside one of the cutters and opposed to the periphery of the other cutter, said pressing member having an acting face which is arranged to bear on one side of the material being cut, and prevent distortion of the same when the material is being moved in such manner as to form a reëntrant curve.

Of the accompanying drawings, forming a part of this specification,—Figure 1 represents an end elevation of a cutting machine embodying my invention, a portion of the base of the machine being broken away. Fig. 2 represents a section on line 2—2 of Fig. 1. Fig. 3 represents an elevation of the opposite side of the machine from that shown in Fig. 2, a portion of the machine being shown in section on line 3—3 of Fig. 1. Fig. 4 represents a section on line 4—4 of Fig. 1, and a plan view of the part below said line. Fig. 5 represents a view similar to a portion of Fig. 1, a portion of the support for the pressing member being removed. Fig. 6 represents a section on line 6—6 of Fig. 5. Fig. 7 represents a perspective view of the parts shown in Fig. 5.

The same reference characters indicate the same parts in all the figures.

In the drawings, 12 and 13 represent a pair of disk cutters located in shearing relation to each other, that is to say, the outer side of one of the cutters is arranged in practically the same plane as the inner side of the opposed cutter, sufficient clearance being provided to enable the said outer and inner sides to slightly overlap each other, if desired, while in shearing contact. The cutter 12 is affixed to a shaft 14, and the cutter 13 to a shaft 15, said shafts being journaled in suitable bearings and adapted to be rotated simultaneously in opposite directions by gearing connecting said shafts. I have not shown the connecting gearing in this case. Said gearing may be as shown in Letters Patent of the United States, No. 897,142, granted to me August 25, 1908. The construction is such, of course, as to provide an open space entirely around the nip of the cutters, in order that the material being fed and cut may be turned laterally or guided in a curved path to form the reëntrant curves above referred to.

The end portion of the shaft 14 carrying the lower cutter 12 is preferably journaled in a bearing formed on a slide 16, to which a quick vertical movement may be imparted by means of a rock shaft 17 journaled in the supporting frame 18 of the machine, and an eccentric stud 19 carried by said rock shaft and engaged with a socket in the slide 16. The outer end portion of the upper shaft 15 is here shown as journaled in a slide 20 which is movable in guides in the upper portion of the supporting frame, and is held fixedly at any desired adjustment by means of a clamping screw 21 and a bearing screw 22.

The operation of the cutters is illustrated in Figs. 5 and 6, which show a piece 23 of sheet material being acted on by the cutters, a portion of the sheet being supported by the upper side of the periphery of the lower cutter 12, while another portion is depressed by the periphery of the upper cutter 13, the two portions being thus severed by the coacting or nip portions of the cutters.

The construction thus far described is well known, and does not of itself constitute my present invention.

In cutting a pattern from a sheet 23 by the use of the disk cutters 12 and 13, the sheet is placed between the cutters which are rotated simultaneously in opposite directions, as indicated by the arrows in Fig. 5. When an article, such as a shoe pattern, is to be formed, said article having variously formed curves on its margin, the operator guides the sheet, which has been previously marked, along the line of the cut and swings the sheet edgewise to cause the cut to progress along the predetermined lines. When the sheet is being swung in the direction required to form a reëntrant curve in the part of the sheet which ultimately constitutes the pattern, said part being the part shown at the left in Fig. 6, the pressure of the edge being formed by the cutters against the outer side of the cutter 13, would, in the absence of the pressing member, hereinafter described, cause the formation of a bur along the reëntrant or inwardly curved edge, this result being due to the lateral pressure of the freshly cut edge against the margin of the cutter 12 at a point behind the nip of the two cutters. To prevent the distortion of the edge of the pattern resulting in the formation of such bur, I provide a pressing member 25 having an acting face which is arranged to bear upon the upper surface of that portion of the material which forms the pattern, the said acting face being located beside and in practically rubbing contact with the outer side of the cutter 13, and opposed to the periphery of the cutter 12, so that the body portion 23 of the sheet passes between the perimeter of the cutter 12, and the acting portion of the pressing member 25. Said acting portion is located sufficiently far behind the nip of the cutters to enable it to bear upon and hold down that portion of the freshly cut edge of the body 23 which, in the absence of the pressing member, would be distorted by contact with the margin of the cutter 13, when the material is being manipulated to cause the formation of a reëntrant curve. The acting portion of the presser 25 therefore acts to hold down the material which would otherwise be displaced into a bur, so that the formation of a bur is prevented, the edges of reëntrant curves formed by the machine being free from distortion.

The pressing member 25 is preferably a disk, the perimeter of which is somewhat beveled, as shown in the drawings, said disk being preferably mounted to rotate freely on a fixed stud 26 attached to a holder 27 which is rigidly affixed to the slide 20 by means of a screw 28 and a dowel 29. It is desirable that the member 25 be free to rotate in order that its frictional resistance to the passage of the material may be reduced to the minimum. The said member may, however, be rigidly mounted so that it will not rotate, and may be of any desired shape.

The action of the cutters in forming a bur on an inwardly curved edge may be understood by reference to Figs. 4 and 5. In Fig. 4, the dotted line 31 indicates the form of the cut when the sheet is moved in the direction of the arrow on said figure. This movement presses the freshly cut inwardly curved edge on the part 23 against the margin of the cutter 13 at the point 32, this point being at the rear of the nip of the cutters. The pressing member 25 covers the side of the cutter 13 at the point 32, and so confines the side of the material on which the inwardly curved edge is being formed, that the material cannot be displaced or distorted along said line. The result is the formation of an inwardly curved edge having smooth, well defined angles, free from burs or distortions.

The numeral 23 (Figs. 4, 5, and 6) designates the part of the sheet from which the pattern is formed, the numeral 24 designating either the chip or waste portion removed from the pattern, or the body of the sheet from which another pattern or patterns may be cut.

The location of the pressing member somewhat in the rear of the nip of the cutters not only enables it to bear on the material at the point 32, which is the point where the cutter 13 emerges from the sheet, but also enables the operator to have an unobstructed view of the sheet at the point where the cut commences.

At the inner side of the cutter 12, and opposed to the periphery of the cutter 13, is a feed roll 34 which may be formed in the same piece with the cutter 12, or in a separate piece and rigidly attached thereto, or adapted to rotate loosely, the periphery of the feed wheel 34 being concentric with the periphery of the cutter 12 and of smaller diameter than the latter, so that it is adapted to coöperate with the periphery of the cutter 13 in grasping and feeding the sheet at one side of the line of cut.

I claim:

1. In combination, a pair of rotary disk cutters mounted in shearing relation to each other with an open space around their nip to permit the material being cut to be turned laterally as it is fed to produce a curved cut, the periphery of one disk being adapted to support the material at one side of the line of cut, while the periphery of the other disk depresses the material at the oposite side of said line, and a pressing member located beside the depressing cutter, and opposed to the periphery of the supporting cutter, said member being located at the rear of the nip of the cutters, and in position to prevent distortion of an inwardly curved edge on the work by pressure of the same against the margin of the depressing cutter.

2. In combination, a pair of rotary shearing disk cutters mounted in shearing relation to each other with an open space around their nip to permit the material being cut to be turned laterally as it is fed to produce a curved cut, and a rotary disk pressing member located beside one of the cutters, with its periphery opposed to the periphery of the other cutter, said pressing member being arranged to bear on the work behind the nip of the cutters, and in position to prevent distortion of an inwardly curved edge by lateral pressure of the same against the margin of the cutter beside which the pressing member is located.

3. In combination, a pair of shearing disk cutters mounted in shearing relation to each other with an open space around their nip to permit the material being cut to be turned laterally as it is fed to produce a curved cut, bearings for the cutters, a holder detachably secured to the bearing of one of the cutters, and a rotary disk pressing member rotatively connected with said holder, and arranged to bear on the work behind the nip of the cutters, and in position to prevent distortion of an inwardly curved edge by lateral pressure of the same against the margin of one of the cutters.

4. In combination, a pair of shearing cutters comprising two opposed rotary disks mounted in shearing relation to each other with an open space around their nip to permit the material being cut to be turned laterally as it is fed to produce a curved cut, one disk having its inner face in substantially the same plane as the outer face of the other, and a roll located beside one of the cutters and having a periphery which is of smaller diameter than said cutter, and is opposed to the periphery of the other cutter, said opposed peripheries being adapted to engage and feed the sheet being cut.

In testimony whereof I have affixed my signature, in presence of two witnesses.

ALBERT F. PRESTON.

Witnesses:
C. F. Brown,
P. W. Pezzetti.